United States Patent [19]

Minagawa et al.

[11] Patent Number: 4,865,823

[45] Date of Patent: Sep. 12, 1989

[54] METHOD FOR RECOVERING GALLIUM

[75] Inventors: Yukinori Minagawa, Ebina; Minoru Tanaka, Kawasaki; Kunihiko Yamaguchi, Sagamihara; Kazumasa Arai, Ihara; Gouichi Muramatsu, Ibara, all of Japan

[73] Assignees: Mitsubishi Chemical Industries Limited; Nippon Light Metal Company, Ltd., both of Tokyo, Japan

[21] Appl. No.: 229,736

[22] Filed: Aug. 3, 1988

Related U.S. Application Data

[63] Continuation of Ser. No. 8,328, Jan. 29, 1987, abandoned.

[30] Foreign Application Priority Data

Jan. 31, 1986 [JP] Japan ................................. 61-19241
Aug. 4, 1986 [JP] Japan ................................ 61-183211

[51] Int. Cl.$^4$ ............................................. C22B 58/00
[52] U.S. Cl. .................................... 423/112; 423/111; 423/125; 423/126; 423/128; 423/131; 423/132; 423/DIG. 14; 75/101 BE; 75/121; 75/2
[58] Field of Search ............... 423/112, DIG. 14, 111, 423/122, 125, 126, 128, 131, 132; 75/101 BE, 121, 2

[56] References Cited

U.S. PATENT DOCUMENTS

| | | | |
|---|---|---|---|
| 3,971,843 | 7/1976 | Helgorsky et al. | 423/112 |
| 4,051,230 | 9/1977 | Miyauchi | 423/112 |
| 4,222,892 | 9/1980 | Motojima et al. | 423/DIG. 14 |
| 4,406,865 | 9/1983 | Fuller | 423/DIG. 14 |
| 4,500,494 | 2/1985 | Scher | 423/DIG. 14 |
| 4,559,203 | 12/1985 | Bauer et al. | 423/112 |
| 4,587,106 | 5/1986 | Bauer et al. | 423/112 |
| 4,587,111 | 5/1986 | Wynn | 75/101 BE |
| 4,631,177 | 12/1986 | Yotsuyanagi et al. | 423/DIG. 14 |
| 4,666,686 | 5/1987 | Krajewski et al. | 423/DIG. 14 |

FOREIGN PATENT DOCUMENTS

| | | | |
|---|---|---|---|
| 1099522 | 4/1981 | Canada | 423/112 |
| 0002970 | 7/1979 | European Pat. Off. | 423/112 |
| 102882 | 3/1984 | European Pat. Off. | 423/112 |
| 2921061 | 11/1980 | Fed. Rep. of Germany | 423/112 |

Primary Examiner—Robert L. Stoll
Assistant Examiner—Paige C. Harvey
Attorney, Agent, or Firm—Oblon, Spivak, McClelland, Maier & Neustadt

[57] ABSTRACT

A method for recovering gallium, which comprises a capturing step of contacting an aqueous solution containing gallium to a chelating agent containing a water-insoluble substituted quinolinol as the active ingredient, to let the chelating agent capture gallium, and an eluting step of contacting an eluting solution composed of an aqueous solution of an acid or strong base containing said substituted quinolinol, to the chelating agent from the capturing step, to elute gallium therefrom.

31 Claims, 2 Drawing Sheets

FIGURE 2

METHOD FOR RECOVERING GALLIUM

This application is a Continuation of application Ser. No. 07/008,328, filed on Jan. 29, 1987, now abandoned.

The present invention relates to a method for recovering gallium. More particularly, it relates to a method for industrially advantageously recovering gallium from an aqueous solution containing gallium, such as a solution of sodium aluminate from a Bayer process, by means of a water-insoluble substituted quinolinol as the active ingredient of a chelating agent.

As a method for recovering gallium wherein a water-insoluble substituted quinolinol is used as a chelating agent, it is known, for example, as a liquid-liquid extraction method, to recover gallium by contacting the Bayer solution with an extracting agent having the above substituted quinolinol dissolved in a non-hydrophilic organic solvent to extract gallium, and then reversely extracting the extracting agent containing gallium, with a reverse extracting agent composed of an aqueous solution of an acid (e.g. Japanese Unexamined Patent Publication No. 32411/1976 and No. 52289/1978). Further, as an adsorption method, a method is known wherein gallium is adsorbed by a solid adsorbent made of a porous polymer having quinolinol retained therein, and then gallium is desorbed with a desorbing agent similar to the above-mentioned reverse extracting agent (Japanese Unexamined Patent Publication No. 42234/1985).

However, in either case of the liquid-liquid extraction method or the adsorption method, the substituted quinolinol is likely to transfer to the reverse extracting agent or to the desorbing agent, and a continuous operation for a long period of time leads to a decrease in the amount of the extraction or adsorption of gallium and thus creates a serious problem.

In the liquid-liquid extraction method, it is relatively easy to supplement the quinolinol to the extraction tank to compensate the decrease due to the transfer. Whereas, in the case of the adsorption method, such a supplement of quinolinol requires a very cumbersome operation. Namely, the adsorbent must be taken out from the packed column, dried and then impregnated with the quinolinol to compensate the amount decreased by the transfer.

In view of the above-mentioned problems in the gallium recovery method, the present inventors have conducted various studies with an aim to develop an economically advantageous method for recovering gallium, which is capable of maintaining the high level of adsorption or extraction of gallium particularly in a continuous operation for a long period of time. As a result, the present invention has been accomplished.

The present invention provides a method for recovering gallium, which comprises a capturing step of contacting an aqueous solution containing gallium to a chelating agent containing a water-insoluble substituted quinolinol as the active ingredient, to let the chelating agent capture gallium, and an eluting step of contacting an eluting solution composed of an aqueous solution of an acid or strong base containing said substituted quinolinol, to the chelating agent from the capturing step, to elute gallium therefrom.

Now, the present invention will be described in detail with reference to the preferred embodiments.

In the accompanying drawings.

The gallium recovery method of the present invention comprises (I) a capturing step i.e. a step of capturing gallium, and (II) an eluting step i.e. a step of eluting gallium.

The capturing step is a step of capturing gallium from an aqueous solution containing gallium, with a chelating agent containing a water-insoluble substituted quinolinol as the active ingredient.

As the active ingredient of the chelating agent which captures gallium, a water-insoluble substituted quinolinol of the following formula is employed in accordance with a conventional method:

wherein R is a hydrocarbon group or a hydrogen atom.

It is preferred to employ a 7-substituted-8-quinolinol, wherein a saturated or unsaturated hydrocarbon group is attached at the 7-position. As the hydrocarbon group, those having from 5 to 20 carbon atoms, particularly from 8 to 20 carbon atoms, are preferred. For example, a 1,4,4,5-tetramethylheptyl group, a 1,4,4,6,6-pentamethyl-1-heptenyl group and a 1-vinyl-3,3,5,5-tetramethylhexyl group may be mentioned.

As the capturing method, either conventional adsorption or liquid-liquid extraction method may be employed.

In the case of the adsorption method, various porous polymers as disclosed in the above-mentioned Japanese Unexamined Patent Publication No. 42234/1985, or porous materials such as carbon materials may be employed as carriers constituting the solid adsorbents. More specifically, in the case of the porous polymers, those having a pore volume of from 0.1 to 2 ml/g, preferably from 0.3 to 1.2 ml/g as measured by mercury injection method and an internal surface area of at least 10 m$^2$/g, preferably from 50 to 800 m$^2$/g as measured by a BET method, are employed. Such porous polymers may be produced by various methods. However, they are produced usually by the copolymerization of a monovinyl compound with a polyvinyl compound, or of polyvinyl compounds themselves, or by the homopolymerization of a polyvinyl compound. As a method for producing porous polymers from these vinyl compounds, it is usual to employ a conventional precipitation solvent method or a linear polymer co-existence method. In the precipitation solvent method, the monomer is dissolved in a solvent which is capable of dissolving the monomer, but incapable of dissolving the homopolymer, and then subjected to suspension polymerization in the presence of a suitable polymerization initiator, to obtain a spherical polymer having a diameter of from 0.1 to 1 mm. In the linear polymer co-existence method, the monomer and the linear polymer such as polystyrene are dissolved in a suitable solvent, and likewise subjected to suspension polymerization, and the linear polymer is extracted and removed from the formed polymer with a suitable solvent.

Carbon material may also be employed as a carrier constituting the solid adsorbent in the case of the adsorption method. As the carbon material, the one having a pore size of at least 10 Å, particularly granular carbon material, is employed. It is particularly preferred to employ processed carbon particles obtained by molding carbon black and a resin binder, followed by sintering, which have a feature that the proportion of the specific surface area of pores having a pore size of from 300 to 1200 Å is at least 30% relative to the total specific surface area. Further, the carbon material may be activated carbon so long as the above conditions are met. For instance, activated carbon Diahope 008 (manufactured by Mitsubishi Chemical Industries Limited) from a coal source, may be mentioned.

The carrier may be other than the above-mentioned porous polymers or carbon materials so long as it satisfies the object of capturing gallium according to the present invention.

In order to have the above-mentioned water-insoluble substituted quinolinol supported on the carrier, the substituted quinolinol may be dissolved in a suitable solvent, and the carrier is put therein and impregnated therewith. The gallium-capturing ability depends on the amount of the substituted quinolinol thus supported or retained in the carrier. Therefore, the greater the amount of the substituted quinolinol retained in the carrier, the better. In order to let the substituted quinolinol be supported in a large amount, the carrier may be put in a solution of the substituted quinolinol, and then the solvent is removed by evaporation. According to this method, it is possible to retain from 0.1 to 1.4 g, preferably from 0.1 to 1.0 g, more preferably from 0.1 to 0.6 g of the substituted quinolinol per 1 g of the carrier when the carrier has a pore volume of from 0.5 to 1.0 ml/g.

The solid-liquid contact method for permitting the solid adsorbent to capture gallium, may be carried out by an agitation tank system. However, it is advantageous to conduct the solid-liquid contact by a column system. The higher the operation temperature, the greater the adsorption speed. Therefore, the adsorption operation is usually conducted at a temperature of from 40° to 80° C. In the case of the column system, the operation is conducted usually at a liquid hourly space velocity of from 1 to 15, preferably from 5 to 10.

When the liquid-liquid extraction method is employed for the capturing step, the substituted quinolinol may be used by itself. However, from the viewpoint of the operation efficiency, it is preferred to employ an extracting agent prepared by dissolving the substituted quinolinol in a non-hydrophilic organic solvent. As the organic solvent, a petroleum fraction such as heptane, kerosine or hexane, an aromatic hydrocarbon such as benzene, toluene or xylene, or a halogenated hydrocarbon such as chloroform or carbon tetrachloride, may be used. The concentration of the substituted quinolinol in the extracting agent may be varied within a wide range, but is usually selected within a range of from 1 to 50% by volume, preferably from 5 to 15% by volume. The treating temperature for extraction of gallium is usually not higher than 100° C., preferably from 40° to 80° C.

For an industrial operation, the contact system is preferably a counter current multi-stage system.

As mentioned above, the gallium-capturing method includes two methods i.e. the adsorption method and the liquid-liquid extraction method. However, the adsorption method is preferred, since the substituted quinolinol fixed on a carrier is extremely stable against degradation even when repeatedly used for the recovery of gallium from a Bayer solution. Further, in the adsorption method, a porous polymer, particularly a porous polymer of polystyrene type or polyester type, is preferred to carbon material as the carrier.

Gallium captured by the substituted quinolinol in the chelating agent is then, transferred to an eluting step. The eluting step is a step of eluting the gallium captured by the chelating agent into an aqueous solution phase.

In the gallium-eluting step, the manner of contact of the chelating agent containing the captured gallium with the eluting solution varies depending upon the manner of capturing employed in the capturing step, and is divided into a liquid-liquid reverse extraction method and a reverse adsorption method (i.e. a desorption method). However, the eluting condition may be the same in both methods. As the eluting solution, an aqueous solution of an acid such as hydrochloric acid or sulfuric acid, or an aqueous solution of a strong base may be used. Preferably, an aqueous acid solution, particularly a hydrochloric solution, is used.

According to the method of the present invention, such as eluting solution contains the same type of the substituted quinolinol as used for the chelating agent. The content of the substituted quinolinol varies depending upon the concentration of the substituted quinolinol in the extracting agent in the case of a liquid-liquid extraction, or depending upon the amount of the substituted quinolinol supported on the carrier in the case of the adsorption method. Further, it may vary depending also on the eluting method and on the concentration of the acid or base in the eluting solution used. However, basically, the content is at least the concentration of the substituted quinolinol dissolved at the time of the contact of the chelating agent with the eluting solution. The concentration is usually at least 1/25, preferably at least 1/10, of the solubility of the substituted quinolinol in the eluting solution. In the case of the liquid-liquid extraction method, the transfer of the substituted quinolinol in the extracting agent to the eluting solution is thereby prevented, and therefore the concentration of the substituted quinolinol in the extracting agent can be maintained at a constant level. Likewise, in the case of the adsorption method, the elution of the substituted quinolinol supported in the solid adsorbent to the eluting solution is thereby prevented, and therefore the amount of the substituted quinolinol retained in the solid adsorbent can be maintained at a constant level. Accordingly, the gallium-capturing ability in both in liquid-liquid extraction method and the adsorption method can be maintained at a constant level without deterioration.

The incorporation of the substituted quinolinol into the eluting solution can be conducted by a usual agitation tank system. The agitation time is, preferably at least 1 hour, more preferably at least 5 hours.

It is possible to employ a method wherein fresh substituted quinolinol is added afresh to an eluting solution before use, and not recovered after the eluting step, or a method wherein the substituted quinolinol contained in the eluting solution discharged from the eluting step is recovered and recycled as described hereinafter, or a combination of both methods.

The concentration of the eluting solution to be used, is at least 0.5 mol/liter, preferably at least 1 mol/liter, in the case of sulfuric acid. In the case of hydrochloric acid, if the concentration exceeds about 5 mol/liter, gallium is likely to form chlorocomplex ions ($[GaCl_4]^-$), which in turn are likely to bond, by ion exchange, to the nitrogen atom of the substituted quinolinol converted to pyridinium ions in the presence of hydrochloric acid, and tends to be hardly eluted. Therefore, the concentration of hydrochloric acid should be at most 5 mol/liter, preferably at most 2 mol/liter. Usually, the hydrochloric acid concentration is selected within a range of from 0.1 to 2 mol/liter, preferably from 0.5 to 2 mol/liter. As the aqueous solution of a strong base, it is usual to employ an aqueous sodium hydroxide solution at a concentration of from 5 to 10 mol/liter, preferably from 6 to 8 mol/liter.

In the case where the method of the present invention is used for the recovery of gallium contained in sodium alminate produced by a Bayer process, not only gallium but also aluminum will be captured by the chelating agent. Therefore, by the above-mentioned eluting method, gallium and aluminum will be simultaneously eluted. In order the avoid this and to recover gallium in a high purity, the gallium-controlling chelating agent may firstly be treated with an aqueous sulfuric acid solution containing the substituted quinolinol and having a concentration of from 0.01 to 0.1 mol/liter to let the solution capture aluminum, and then the above-mentioned eluting treatment is conducted to elute gallium. In the case where hydrochloric acid is used as the eluting solution, the gallium-containing chelating agent may firstly be treated with an aqueous hydrochloric acid solution containing the substituted quinolinol and having a concentration of from 0.01 to 0.2 mol/liter to elute aluminum, and then the above-mentioned eluting treatment is conducted to elute gallium. In these two step eluting methods, the differences in the stability between the aluminum complex and the gallium complex due to the acid concentration are utilized. In either method, it is possible to substantially completely separate and recover aluminum and gallium from the gallium-containing chelating agent.

The operation of the eluting step may be conducted by using a counter current multistage system in the same manner as in the capturing step, and may be carried out in either an agitation tank system or a column system. In the case of the column system, the liquid hourly space velocity is usually from 1 to 15.

In the case where gallium is recovered by the adsorption method without recovering the substituted quinolinol added to the eluting solution, after the eluting step, if the substituted quinolinol elutes to the eluting solution, the adsorbing capacity of the adsorbent decreases in proportion to the number of times in the use of the adsorbent. By an addition of the substituted quinolinol to the eluting solution, the consumption of the substituted quinolinol increases correspondingly, but the substituted quinolinol supported in the adsorbent will not elute to the eluting solution, and there will be no substantial decrease in the gallium adsorbing capacity of the adsorbent. As a result, the supplement of the adsorbent may be required only for the purpose of complementing the mechanical consumption during the adsorption and desorption processes. Further, this will bring about not only such an effect that the adsorption rate can be maintained at a constant level, but also an effect that the time- and labour-consuming operations for the replacement of the adsorbent such as disassembling of the system and reverse washing, can be omitted.

Gallium in the eluting solution thus obtained, can be separated and recovered by a conventional method, for example, by neutralizing it with a base to precipitate it in the form of a hydroxide, followed by filtration.

Further, it is also possible to provide, before the gallium recovery step for recovering gallium from the eluting solution, a quinolinol recovery step for recovering the substituted quinolinol dissolved in the gallium-containing eluting solution, so that at least a part, preferably the entire amount, of the substituted quinolinol separated in this step is added to the eluting solution for the eluting step for reuse.

The recovery of the substituted quinolinol dissolved in the gallium-containing eluting solution can be carried out usually by the contact with a non-hydrophilic organic solvent. The organic solvent to be used for this purpose, may be the same as used as a diluent for the chelating agent in the above-mentioned capturing step. It is used in an amount of from 1/10 to 5 by volume ratio, preferably from 1/5 to 2 by volume ratio, relative to the eluting solution. The contacting time may be from 1 to 5 minutes since the eluting rate of the substituted quinolinol to an organic solvent is high. The substituted quinolinol-containing organic phase separated from the eluting solution, is then subjected to distillation treatment to remove the organic solvent and to recover the substituted quinolinol.

The recovery of the substituted quinolinol dissolved in the gallium-containing eluting solution, can be carried out also by the contact with an adsorbent. There is no particular restriction as to the adsorbent which may be employed for the adsorption of the substituted quinolinol. However, it is usual to employ the synthetic adsorber or carbon material such as granular carbon or activated carbon, as used in the capturing step. The amount of the adsorbent may vary depending upon the type of the adsorbent, the content of the substituted quinolinol in the eluting solution, etc. However, for example, in the case where the operation is conducted in an agitation tank system by means of granular carbon material, the amount of the adsorbent may be at least 4% (weight/volume) relative to the eluting solution to attain the object sufficiently. The lower the treating temperature is, the higher the adsorption rate tends. However, the treating temperature may usually be from 10° to 50° C. The contact of the adsorbent with the eluting solution, may be conducted in an agitation tank system or in a column system. For a large scale operation, a column system is preferred wherein the eluting solution is permitted to pass through a fixed bed column of the adsorbent. The contact time of the eluting solution with the adsorbent is preferably at least 2 hours in the case of the agitation tank system in order to effectively utilize the adsorbent. In the case of the column system, the liquid hourly space velocity is usually from 1 to 5.

The substituted quinolinol adsorbed by an adsorbent can be eluted and recovered by the contact with an organic solvent. In such a case, it is preferred to use granular carbon material as the adsorbent in the preceeding step of adsorbing the substituted quinolinol. Particularly preferred is the processed carbon particles as described above. There is no particular restriction as to the organic solvent to be used for the elution of the substituted quinolinol, so long as it is capable of dissolving the substituted quinolinol. Specifically, any one of the organic solvents useful for the liquid-liquid extraction method in the above-mentioned capturing step, may be employed. Further, it is also possible to use a low boiling point solvent such as acetone, methanol or ethanol. The contact of the organic solvent with the adsorbent having the substituted quinolinol adsorbed therein, can be conducted in an agitation tank system or in a column system. In the case of the agitation tank system, the contact time may be a few minutes to accomplish the object. In the case of the column system, the liquid hourly space velocity is usually from 1 to 10, preferably from 1 to 5. The organic solvent is used in an amount of at least 2 to 3 times, preferably at least 5 times (volume/weight) relative to the adsorbent. The substituted quinolinol dissolved in the organic solvent may be isolated and recovered by removing the organic solvent by distillation.

By either method of the above quinolinol recovery step, the substituted quinolinol can be recovered substantially in its entire amount, which can then be recycled to the eluting step, while the gallium-containing eluting solution is transferred to the above-mentioned gallium recovery step without any loss of gallium, whereupon gallium is recovered.

Now, the most preferred embodiment wherein the quinolinol recovery step is provided, will be described with reference to FIG. 2.

Figure 2:
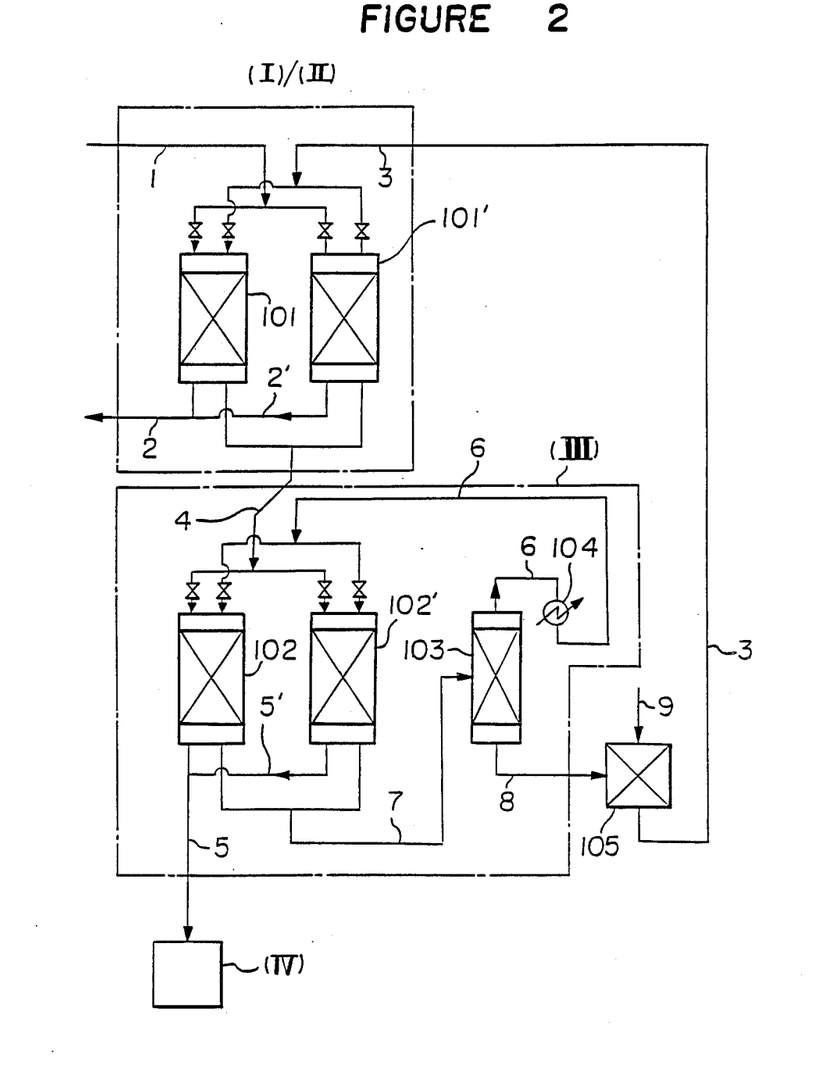
FIG. 2 is a flow sheet illustrating an embodiment of the present invention, wherein (I) indicates the capturing step, (II) indicates the eluting step, (III) indicates the quinolinol recovery step, and (IV) indicates the gallium recovery step.

FIG. 2 is a flow sheet illustrating the main parts of the method of the present invention. In the Figure, washing steps, etc. which may be conducted between the respective steps, are omitted.

Reference numerals (I) and (II) represent the gallium capturing step and the gallium eluting step. Columns 101 and 101' are packed with a solid adsorbent composed of granular carbon material and the substituted quinolinol supported thereon. From a conduit 1, a Bayer solution is introduced into the column 101, and discharged to a conduit 2. After a predetermined amount of the Bayer solution is passed through the column 101, the Bayer solution is introduced in a predetermined amount into the column 101' from the conduit 1 and discharged to a conduit 2' by the switching operation of the cock. After the passage of the Bayer solution through the column 101, water is introduced from a washing pipe not shown to flush the interior of the column. (The same applies to the column 101', and in the following description, only one flow in the switching operation will be explained.) To the column 101 after flushing with water, an eluting solution is supplied from a conduit 3.

The eluting solution containing captured gallium is introduced via a conduit 4 into a column 102 or 102' packed with an adsorbent, whereupon the substituted quinolinol is adsorped by the adsorbent. After the removal of the substituted quinolinol, the gallium solution is passed through a conduit 5 or 5' and collected to a gallium recovery step (IV). Into the column 102, an organic solvent is introduced from a conduit 6 after switching the cock, whereby the substituted quinolinol is eluted and recovered from a conduit 7. The organic solvent containing this substituted quinolinol is passed through a conduit 7 and introduced into a distillation tower 103. The organic solvent is led to a conduit 6 at the top, while the substituted quinolinol is led to a conduit 8 at the bottom. The organic solvent is collected in the form of liquid by a condenser 104, passed through a conduit 6 and recycled to the column 102 or 102'. On the other hand, the substituted quinolinol is transferred to a tank 105, and an eluting solution is added thereto from a conduit 9 and mixed. The eluting solution containing the substituted quinolinol is passed through a conduit 3 and recycled to the column 101 or 101'.

A base is added to gallium collected in the gallium recovery step (IV), and gallium is recovered in the form of gallium hydroxide.

Now, the present invention will be described in further detail with reference to the Examples. However, it should be understood that the present invention is by no means restricted to these specific Examples.

EXAMPLE 1

(1) Washing of a porous polymer 200 ml of acetone was added to 50 g of a porous polymer Diaion HP-20 (a polymer of styrene with divinylbenzene, particle size: 0.4 mm, pore volume: 1.177 ml/g, specific surface area: 511 m$^2$/g, manufactured by Mitsubishi Chemical Industries Limited), and the mixture was stirred. Then, acetone and the porous polymer were separated by decantation. The same operation was repeated 4 times, and then the porous polymer was collected by filtration under suction, washed and dried in a vacuum dryer for 3 hours.

(2) Supporting of Kelex 100

A solution obtained by dissolving 15 g of Kelex 100 (effective component:

) of Sherling Company in 300 ml of acetone, was added to 50 g of the dried porous polymer. While stirring the mixture, acetone was evaporated over a period of 4 hours. Then, the product was immersed in 250 ml of a 3N aqueous hydrochloric acid solution for 3 hours, and then washed with water. Then, it was immersed in 250 ml of a 3N aqueous sodium hydroxide solution for 3 hours, and washed with water, whereby a porous polymer having 30% by weight of Kelex 100 supported thereon was obtained.

(3) Preparation of a 1N aqueous hydrochloric acid solution containing Kelex 100

To 1 liter of a 1N aqueous hydrochloric acid solution, 0.5 g of Kelex 100 was dropwise added, and the mixture was stirred for 5 hours. The mixture was subjected to natural filtration by a filtering paper to remove non-dissolved Kelex 100, whereby a 1N aqueous hydrochloric acid solution containing Kelex 100 was obtained.

The content of Kelex 100 was quantitatively analyzed by ultraviolet absorption. Namely, the above-mentioned Kelex solution was put in a quartz absorption cell with a thickness of 10 mm, and the absorption spectrum was measured by 323 model Hitachi autographic spectrophotometer. The concentration of Kelex 100 was obtained from the absorbance at a absorption wave length of 246 nm, and found to be 49 mg/liter. This was diluted with 1N hydrochloric acid to obtain a solution having a Kelex concentration of 10 mg/liter.

(4) Column test 25 ml (volume in water) of the Kelex 100-containing polymer prepared in the above step 2 was packed into a glass column having an inner diameter of 18 mm (packed height: 100 mm).

The following solutions were passed through this column in the indicated sequence. The column was heated to 50° C. only when a Bayer solution was passed therethrough.

|  | Liquid hourly space velocity (S.V) | Amount passed (ml) |
|---|---|---|
| (1) Bayer solution (50° C.) (Ga concentration: 0.15 g/l, Al concentration: 43 g/l, Na$_2$O concentration: 140 g/l) | 5 | 250 |
| (2) Water | 15 | 160 |
| (3) 1N hydrochloric acid (Kelex concentration 10 mg/l) | 5 | 188 |
| (4) Water | 15 | 160 |

One cycle comprising (1) to (4) was repeated 105 times (105 cycles).

The gallium content was analyzed by atomic absorptiometry with respect to the gallium desorbing solution of each cycle (the elution from the column (3)). The results are shown in Table 1.

TABLE 1

| Cycle No. | Ga content in the desorbing solution (mg) | Relative ratio (Based on 1.00 of the first cycle) |
|---|---|---|
| 1 | 23.5 | 1.00 |
| 12 | 24.0 | 1.02 |
| 21 | 22.8 | 0.97 |
| 30 | 23.1 | 0.98 |
| 50 | 23.5 | 1.00 |
| 71 | 25.7 | 1.09 |
| 90 | 23.6 | 1.00 |
| 100 | 25.2 | 1.07 |

Figure 1:
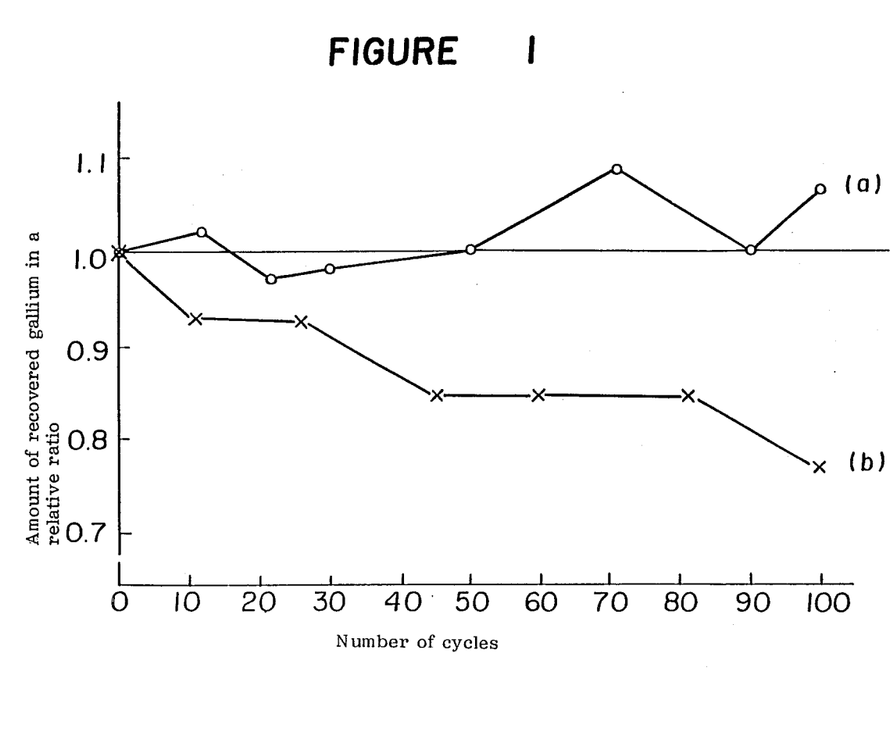
FIG. 1 is a graph showing the results of Example 1 and Comparative Example 1, wherein the abscissa indicates the number of cycles, and the ordinate indicates the amount of recovered gallium in a relative ratio. In this Figure, (a) represents Example 1, and (b) represents Comparative Example 1.

Further, these results are also shown by line (a) in FIG. 1.

In FIG. 1, the abscissa indicates the number of cycles, and the ordinate indicates the amount of recovered gallium by a relative value based on 1.00 of the first cycle.

COMPARATIVE EXAMPLE 1

The same operation as in Example 1 was conducted except that the desorption of gallium was carried out by using a 1N aqueous hydrochloric acid solutioin for desorption of gallium, which contained no Kelex 100. 100 Cycles were repeated.

The gallium content in the gallium desorbing solution in each cycle was analyzed. The results are shown in Table 2.

TABLE 2

| Cycle No. | Ga content in the desorbing solution (mg) | Relative ratio (Based on 1.00 of the first cycle) |
|---|---|---|
| 1 | 24.3 | 1.00 |
| 11 | 22.5 | 0.93 |
| 26 | 22.5 | 0.93 |
| 45 | 20.6 | 0.85 |
| 60 | 20.6 | 0.85 |
| 81 | 20.6 | 0.85 |
| 100 | 18.8 | 0.77 |

The results are also shown by line (b) in FIG. 1.

EXAMPLE 2

100 Parts by volume of a porous polymer Diaion HP-20 having 30% by weight of Kelex 100 supported thereon in the same manner as in Example 1, was packed in a column equipped with a jacket. This column was heated to 50° C., and a Bayer solution (Ga: 170 mg/liter, Al: 43 g/liter) of 50° C. was passed therethrough at a liquid hourly space velocity of 5 in an amount 10 times by volume the porous polymer (hereinafter "times by volume" means a volume relative to the carrier such as the porous polymer). By this operation, 59% of gallium in the Bayer solution was captured.

Then, 6.5 times by volume of water was passed through the column at a liquid hourly space velocity of 15, and then 7.5 times by volume of a 1N aqueous hydrochloric acid solution containing 15 mg/liter of Kelex 100 in the same manner as in Example 1, was passed therethrough at a liquid hourly space velocity of 5. By this gallium-eluting operation, 90% of captured gallium was recovered. The concentration of Kelex 100 in the aqueous hydrochloric acid solution as the eluting solution was 8.6 mg/liter.

To the aqueous hydrochloric acid solution containing Kelex 100 and eluted gallium, a ½ volume of chloroform was added, and the mixture was stirred for 5 minutes. Chloroform containing Kelex 100 was separated from the aqueous solution, and supplied to a distillation tower and treated under reduced pressure at a temperature of from 40° to 50° C. to recover Kelex 100. The recovery rate was 91%. Recovered Kelex 100 was withdrawn from the distillation tower, and transferred to an agitation tank. Then, a 1N aqueous hydrochloric acid solution was supplied thereto. In the agitation tank, Kelex 100 was supplemented to compensate the loss and to bring the Kelex 100 content to a level of 15 mg/liter. The aqueous hydrochloric acid solution thus obtained, was recycled as an eluting solution, and the recovery of gallium from the Bayer solution was continuously conducted.

EXAMPLE 3

To an aqueous hydrochloric acid solution containing Kelex 100 used for the elution of gallium in the same manner as in Example 2, 0.6% (weight/volume) of a porous polymer SP-206 (a styrene-type polymer, particle size: 0.4 mm, pore volume: 0.9 ml/g, specific surface area: 556 m$^2$/g, manufactured by Mitsubishi Chemical Industries Limited) was added, and the mixture was stirred for 3 hours. By this operation, 96% of Kelex 100 in the eluting solution was adsorbed, whereas the gallium content in the aqueous phase underwent no substantial change.

Then, the porous polymer having Kelex 100 adsorped thereon was separated from the aqueous phase, and washed with 2 times by volume of water, and then dried under reduced pressure at a temperature of from 40° to 50° C. To the dried porous polymer, 10 times by volume of methanol was added, and the mixture was stirred for 5 minutes to elute Kelex 100. Methanol containing Kelex 100 was supplied to a distillation tower and treated under reduced pressure at a temperature of from 40° to 50° C. to recover Kelex 100. The recovery rate was 58%.

Recovered Kelex 100 was transferred to an agitation tank, and a 1N aqueous hydrochloric acid solution and additional Kelex 100 were added to obtain an aqueous hydrochloric acid solution containing 10 mg/liter of Kelex 100. The aqueous hydrochloric acid solution thus obtained was recycled as an eluting solution, and the recovery of gallium from the Bayer solution was conducted continuously.

EXAMPLE 4

In this Example, the recovery of gallium was conducted in accordance with the flow sheet shown in FIG. 2.

250 Parts by volume of granular carbon material (pore volume: 0.7 ml/g, specific surface area: 190 m$^2$/g, average pore size; 600 Å, pores having a pore size of from 300 to 1200 Å constitute at least 90% of the total pores) having 20% by weight of the substituted quinolinol retained therein, was packed into the columns 101 and 101' equipped with jackets. Both columns were heated to 50° C., and a Bayer solution (Ga 184 mg/liter, Al: 43 g/liter, Ga/Al=4.5×10$^{-3}$) of 50° C. from the conduit 1 was passed therethrough at a liquid hourly space velocity of 10 in an amount 20 times by volume the granular carbon material. By this operation, 37% of gallium in the Bayer solution was captured.

Then, 13 times by volume of water was passed therethrough at a liquid hourly space velocity of 10, and then 1N hydrochloric acid containing 57 mg/liter of the substituted quinolinol from the conduit 3, was passed therethrough at a liquid hourly space velocity of 10 in an amount of 15 times by volume. By this gallium-eluting operation, 97% of captured gallium was recovered. (Further, the weight ratio of gallium to aluminum in the eluting solution was Ga/Al=0.88.) The concentration of the substituted quinolinol in the eluting solution was 50 mg/liter. The aqueous solution containing the substituted quinolinol used for the elution of gallium, was withdrawn from the conduit 4, and passed through the column 102 packed with 18 parts by volume of granular carbon material (the ratio of the specific surface area of pores having a pore size of from 300 to 1200 Å to the total specific surface area=0.31), at a liquid hourly space velocity of 2. No substituted quinolinol was detected in the solution from the conduit 5, and no substantial change was observed in the gallium content in the solution. Then, 5 times by volume of water was passed through the column 102 at a liquid hourly space velocity of 10, and then acetone from the conduit 6 was passed at a liquid hourly space velocity of 2 in an amount of 11 times by volume. Acetone containing the substituted quinolinol was withdrawn from the conduit 7, and supplied to the distillation tower 103 and treated under reduced pressure at a temperature of from 40° to 50° C. to obtain the substituted quinolinol. The recovery rate was 97%. The recovered substituted quinolinol was withdrawn from the conduit 8, and introduced into the agitation tank 105, while a 1N aqueous hydrochloric acid solution was supplied from the conduit 9. In the agitation tank 105, the substituted quinolinol was supplemented to compensate the loss and to bring the substituted quinolinol concentration to a level of 57 mg/liter. The aqueous hydrochloric acid solution thus obtained was recycled as an eluting solution from the conduit 3 to the columns 101 and 101' by switching operation.

EXAMPLE 5

To an aqueous solution containing the substituted quinolinol subjected to the elution of gallium in the same manner as in Example 4, 1.0% (weight/volume) of the porous polymer SP-206 (the same as used in Example 3) was added, and the mixture was stirred for 3 hours. After stirring, the gallium content in the aqueous phase underwent no substantial change, and the concentration of the substituted quinolinol was 1.5 mg/liter.

Then, the porous polymer having the substituted quinolinol adsorped therein, was separated from the aqueous phase, and washed with 2 times by volume of water, and then dried under reduced pressure at a temperature of from 40° to 50° C. To the dried porous polymer, 10 times by volume of acetone was added, and the mixture was stirred for 5 minutes to elute the substituted quinolinol. Acetone containing the substituted quinolinol was treated in a distillation tower under reduced pressure at a temperature of from 40° to 50° C. to recover the substituted quinolinol. The recovery rate was 79%. The recovered substituted quinolinol was transferred to the agitation tank, and an eluting solution was prepared in the same manner as in Example 4, and recycled to the eluting step.

EXAMPLE 6

To the eluting solution containing the substituted quinolinol used for the elution of gallium in the same manner as in Example 4, a ½ volume of chloroform was added, and the mixture was stirred for 5 minutes. The concentration of the substituted quinolinol in the aqueous phase was 4.5 mg/liter, and no substantial change was observed in the gallium concentration in the aqueous phase.

Then, chloroform containing the substituted quinolinol was separated from the aqueous phase, and treated in a distillation tower under pressure at a temperature of from 40° to 50° C. to recover the substituted quinolinol. The recovery rate was 91%.

The recovered substituted quinolinol was transferred to an agitation tank, and an eluting solution was prepared in the same manner as in Example 4, and recycled to the eluting step.

As described in the foregoing, the method of the present invention is extremely useful for an industrial application, since the gallium recovery rate such as the adsorption or extraction of gallium, can be maintained at a high level.

We claim:

1. A method for recovering gallium, which comprises a capturing step of contacting an aqueous solution containing gallium to a chelating agent containing a water-insoluble substituted quinolinol as the active ingredient, to let the chelating agent capture gallium, and an eluting step of contacting an eluting solution composed of an aqueous solution of an acid or base containing said substituted quinolinol with the concentration of the substituted quinolinol being at least the concentration of the substituted quinolinol dissolved into the eluting solution at the time of the contact, to the chelating agent from the capturing step, to elute gallium therefrom, and an operation of reusing the chelating agent from the eluting step, for the above capturing step.

2. The method according to claim 1, wherein the chelating agent is composed of a carrier and the water-insoluble substituted quinolinol retained therein.

3. The method according to claim 2, wherein the carrier is a porous material wherein the proportion of the specific surface area of pores within a pore size range of from 10 to 1200 Å is at least 30% of the total specific surface area.

4. The method according to claim 2, wherein the carrier is a porous polymer, granular carbon material or activated carbon.

5. The method according to claim 2, wherein the chelating agent contains from 0.1 to 1.4 g of the water-insoluble substituted quinolinol retained per 1 g of the carrier.

6. The method according to claim 1, wherein the eluting solution is a sulfuric acid solution having a concentration of at least 0.5 mol/liter.

7. The method according to claim 1, wherein the eluting solution is a hydrochloric acid solution having a concentration of at most 5 mol/liter.

8. A method for recovering gallium, which comprises a capturing step of contacting an aqueous solution containing gallium to a chelating agent containing a water-insoluble substituted quinolinol as the active ingredient, to let the chelating agent capture gallium, an eluting step of contacting an eluting solution composed of an aqueous solution of an acid or base containing said substituted quinolinol with the concentration of the substituted quinolinol being at least the concentration of the substituted quinolinol dissolved into the eluting solution at the time of the contact, to the chelating agent from the capturing step, to elute gallium therefrom, a quinolinol recovery step of recovering said substituted quinolinol from the gallium-containing eluting solution discharged from the eluting step, a gallium recovery step of recovering gallium from the gallium-containing eluting solution discharged from the quinolinol recovery step and having the substituted quinolinol removed, an operation of reusing the substituted quinolinol recovered in the quinolinol recovery step as at least a part of the substituted quinolinol contained in the eluting solution, and an operation of reusing the chelating agent from the eluting step, for the above capturing step.

9. The method according to claim 8, wherein the chelating agent is composed of a carrier and the water-insoluble substituted quinolinol retained therein.

10. The method according to claim 9, wherein the carrier is a porous material wherein the proportion of the specific surface area of pores within a pore size range of from 10 to 1200 Å is at least 30% of the total specific surface area.

11. The method according to claim 9, wherein the carrier is a porous polymer, granular carbon material or activated carbon.

12. The method according to claim 9, wherein the chelating agent contains from 0.1 to 1.4 g of the water-insoluble substituted quinolinol retained per 1 g of the carrier.

13. The method according to claim 8, wherein the eluting solution is a sulfuric acid solution having a concentration of at least 0.5 mol/liter.

14. The method according to claim 8, wherein the eluting solution is a hydrochloric acid solution having a concentration of at most 5 mol/liter.

15. The method according to claim 8, wherein the quinolinol recovery step comprises contacting an organic phase composed of a non-hydrophilic organic solvent, to the gallium-containing eluting solution, to transfer the water-insoluble substituted quinolinol to the organic phase, and then recovering the water-insoluble substituted quinolinol from the organic phase.

16. The method according to claim 15, wherein the non-hydrophilic organic solvent is heptane, hexane, kerosine, benzene, toluene, xylene, chloroform or carbon tetrachloride.

17. The method according to claim 8, wherein the quinolinol recovery step comprises contacting an adsorbent to the gallium-containing eluting solution to let the adsorbent adsorb the water-insoluble substituted quinolinol, then contacting an organic solvent to the adsorbent to desorb the water-insoluble substituted quinolinol therefrom, and recovering the water-insoluble substituted quinolinol from the organic solvent.

18. The method according to claim 17, wherein the adsorbent is a porous polymer, granular carbon material or activated carbon.

19. The method according to claim 17, wherein the organic solvent is acetone, methanol, ethanol, chloroform or hexane.

20. A method for recovering gallium, which comprises a capturing step of contacting an aqueous solution containing gallium to a chelating agent containing a water-insoluble substituted quinolinol as the active ingredient, to let the chelating agent capture gallium, an eluting step of contacting an eluting solution composed of an aqueous solution of an acid or base containing said substituted quinolinol with the concentration of the substituted quinolinol being at least the concentration of the substituted quinolinol dissolved into the eluting solution at the time of the contact, to the chelating agent from the capturing step, to elute gallium therefrom, a gallium recovery step of recovering gallium from the gallium-containing eluting solution discharged from the eluting step, without recovering the substituted quinolinol contained therein, and an operation of reusing the chelating agent from the eluting step, for the above capturing step.

21. The method according to claim 20, wherein the chelating agent is composed of a carrier and the water-insoluble substituted quinolinol retained therein.

22. The method according to claim 21, wherein the carrier is a porous material wherein the proportion of the specific surface area of pores within a pore size range of from 10 to 1200 Å is at least 30% of the total specific surface area.

23. The method according to claim 21, wherein the carrier is a porous polymer, granular carbon material or activated carbon.

24. The method according to claim 21, wherein the chelating agent contains from 0.1 to 1.4 g of the water-insoluble substituted quinolinol retained per 1 g of the carrier.

25. The method according to claim 20, wherein the eluting solution is a sulfuric acid solution having a concentration of at least 0.5 mol/liter.

26. The method according to claim 20, wherein the eluting solution is a hydrochloric acid solution having a concentration of at most 5 mol/liter.

27. A method according to claim 1, wherein the concentration of substituted quinolinol in said eluting solution is at least 1/25 of the solubility of the substituted quinolinol in the eluting solution.

28. The method according to claim 8, wherein the concentration of substituted quinolinol in said eluting solution is at least 1/25 of the solubility of the substituted quinolinol in the eluting solution.

29. The method according to claim 20, wherein the concentration of substituted quinolinol in said eluting solution is at least 1/25 of the solubility of the substituted quinolinol in the eluting solution.

30. A method for recovering gallium, which comprises a capturing step of contacting an aqueous solution containing gallium to a chelating agent containing from 0.1 to 1.4 g of a water-insoluble substituted quinolinol as the active ingredient retained per 1 g of a carrier, to let the chelating agent capture gallium, an eluting step of contacting an eluting solution composed of an aqueous solution of an acid or base containing said substituted quinolinol with the concentration of the substituted quinolinol being at least the concentration of the substituted quinolinol dissolved into the eluting solution at the time of the contact, to the chelating agent from the capturing step, to elute gallium therefrom, a quinolinol recovery step of contacting an organic phase composed of a non-hydrophilic organic solvent, to the gallium-containing eluting solution from the quinolinol recovery step, to transfer the water-insoluble substituted quinolinol to the organic phase, and then recovering the water-insoluble substituted quinolinol from the organic phase, a gallium recovery step of recovering gallium from the gallium-containing eluting solution discharged from the quinolinol removed, an operation of reusing the substituted quinolinol recovered in the quinolinol recovery step as at least a part of the substituted quinolinol contained in the eluting solution, and an operation of reusing the chelating agent from the eluting step, for the above capturing step.

31. A method for recovering gallium, which comprises a capturing step of contacting an aqueous solution containing gallium to a chelating agent containing from 0.1 to 1.4 g of a water-insoluble substituted quinolinol as the active ingredient retained per 1 g of a carrier, to let the chelating agent capture gallium, an eluting step of contacting a hydrochloric acid solution having a concentration of at most 5 mol/liter as an eluting solution containing said substituted quinolinol with the concentration of the substituted quinolinol being at least the concentration of the substituted quinolinol dissolved into the eluting solution at the time of the contact, to the chelating agent from the capturing step, to elute gallium therefrom, a gallium recovery step of recovering gallium from the gallium-containing eluting solution discharged from the eluting step, without recovering the substituted quinolinol contained therein, and an operation of reusing the chelating agent from the eluting step, for the above capturing step.

* * * * *